Patented June 7, 1932

1,861,917

UNITED STATES PATENT OFFICE

WINFRID HENTRICH, OF LEVERKUSEN-ON-THE-RHINE, AND JOSEF HILGER, OF COLOGNE-MULHEIM, GERMANY, ASSIGNORS TO GENERAL ANILINE WORKS, INC., OF NEW YORK, N. Y., A CORPORATION OF DELAWARE

AZODYESTUFFS CONTAINING COPPER

No Drawing. Application filed May 29, 1930, Serial No. 457,526, and in Germany June 3, 1929.

The present invention relates to azodyestuffs containing copper, more particularly it relates to azodyestuffs which may be represented by the probable general formula:

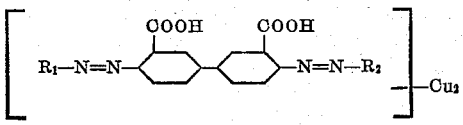

wherein "$R_1$" and "$R_2$" stand for naphthalene nuclei each of which being substituted by a hydroxy group in ortho-position to the azo groups, each of the naphthalene nuclei "$R_1$" and "$R_2$" being further substituted by two sulfonic acid groups and an amino group, and wherein the amino groups may be further substituted by alkyl or acyl groups.

Our new ortho-carboxy azodyestuffs containing copper are obtainable by causing an agent yielding copper, such as cupric sulfate, cupric acetate, finely divided copper or the like, to act on an azodyestuff which is obtained by coupling in alkaline solution a tetrazotized 4.4′-diaminodiphenyl-3.3′-dicarboxylic acid with two similar or two dissimilar molecular proportions of an aminohydroxy-naphthalene-disulfonic acid or an N-alkyl- or N-acyl-substitution product thereof. Or otherwise our new azodyestuffs containing copper are prepared by effecting coupling in the presence of a copper compound yielding copper or of finely divided copper, or finally, the copper compound of the azodyestuff can be produced by employing a dyeing bath containing one of the specified ortho-carboxy azodyestuffs with the addition of an agent yielding copper.

The quantity of the compounds yielding copper present in the coppering process may be varied within the widest limits, but generally we take care that for each molecule of the dyestuff about two molecules of copper are present in view of the two groupings combining with copper of the disazodyestuffs coming into consideration for the purpose of the invention. It is to be understood that the copper compounds prepared with less than the above stated quantity of copper fall within the scope of our invention.

Our new copper containing ortho-carboxy azodyestuffs are generally dark, metallic lustrous powders, insoluble in water, soluble in dilute aqueous alkalies dyeing vegetable fibers blue to bluish-grey shades. Besides possessing rather outstanding clearness of shade, the dyeings also exhibit good fastness properties, such as for example, fastness to light and ironing. The new copper compounds are also in part adapted to the even dyeing of viscose of varying origin.

The present invention is illustrated by the following examples, without being limited thereto:

*Example 1.*—932 parts by weight of the azodyestuff from one molecular proportion of tetrazotized 4.4′-diaminodiphenyl-3.3′-dicarboxylic acid and two molecular proportions of 1.8-aminonaphthol-2.4-disulfonic acid are dissolved in 20000 parts of water. After acidification with acetic acid, a solution of 250 parts by weight of crystalline copper sulfate is added and heating is effected with stirring at 80° C. for 2 hours. The precipitated dyestuff having in its free state the following formula:

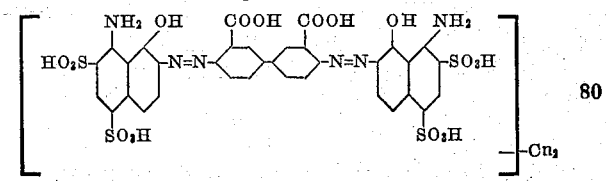

is filtered and converted into its sodium salt with sodium carbonate. The sodium salt is a lustrous, dark metallic powder, readily soluble in water. It dyes the fiber from the Glauber salt-sodium carbonate bath in outstandingly clear greenish blue shades of excellent fastness to light and ironing.

*Example 2.*—A solution of 400 parts by weight of copper sulfate in five times the quantity of water is added with stirring to a solution of 638 parts by weight of 1.8-amino-naphthol-3.6-disulfonic acid in 10000 parts of water and 400 parts by weight of sodium carbonate in the presence of some pyridine. A solution of the tetrazo compound from 272 parts by weight of 4.4'-diaminodiphenyl-3.3'-dicarboxylic acid is then caused to flow into the suspension obtained while stirring and cooling. When the coupling is complete, dilution with water takes place and any unchanged copper hydroxide is filtered off and again extracted repeatedly with hot water. The copper containing dyestuff having in its free state the following formula:

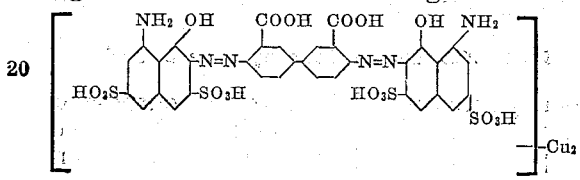

is separated from the aqueous solution in form of its sodium salt by the addition of common salt. It gives greenish blue shades on the vegetable fiber. The dyeing is outstandingly fast to light and ironing.

By replacing the 1.8-aminonaphthol-3.6-disulfonic acid by its N-substitution products, such as for example, by 1-acetylamino-8-naphthol-3.6-disulfonic acid or by 1-ethylamino-8-naphthol-3.6-disulfonic acid a somewhat more red dyeing dyestuff is obtained in the former case and a still more green dyeing dyestuff in the latter case possessing similar fastness properties.

*Example 3.*—A dye-bath consisting of 2% of the azodyestuff from one molecular proportion of tetrazotized 4.4'-diaminodiphenyl-3.3'-dicarboxylic acid and two molecular proportions of 1.8-aminonaphthol-4.6-disulfonic acid, 0.2% of copper sulfate, 20% of sodium sulfate and 2% of sodium carbonate is employed. The cotton is placed in the dye-bath at 40–50° C. and the temperature raised slowly to boiling and kept for ½–1 hour at this temperature. After rinsing and drying a clear blue dyeing is obtained possessing similar fastness properties to those shown by the dyestuffs described in the above examples.

By replacing in this example the 1.8-aminonaphtol-4.6-disulfonic acid by 1-acetyl-amino-8-naphthol-4.6-disulfonic acid, a somewhat more red shade is obtained, possessing a still better fastness to light.

*Example 4.*—By applying the coppering process of Example 1 to the dyestuff which is obtainable by the combination of one molecular proportion of the tetrazo compound of 4.4'-diaminodiphenyl-3.3'-dicarboxylic acid and two molecular proportions of 2.8-aminonaphthol-3.6-disulfonic acid a copper compound is obtained, which dyes the vegetable fiber grey shades. The dyeing possesses excellent fastness properties. It can be diazotized on the fiber and developed with m-phenylene-diamine to a grey, fast to washing and with β-naphthol to a bluish-grey.

*Example 5.*—By applying the coppering process of Example 1 to the azodyestuff which is obtainable from one molecular proportion of tetrazotized 4.4'-diaminodiphenyl-3.3'-dicarboxylic acid, one molecular proportion of 1.8-aminonaphthol-2.4-disulfonic acid and one molecular proportion of 1.8-aminonaphthol-3.6-disulfonic acid, a copper compound is obtained, which dyes the vegetable fiber in clear blue shades of outstanding fastness.

We claim:

1. As new products ortho-carboxy azodyestuffs containing copper of the probable general formula:

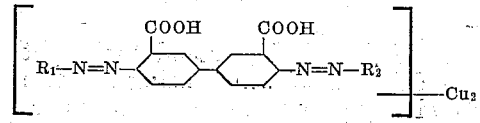

wherein "$R_1$" and "$R_2$" stand for naphthalene nuclei which are substituted by hydroxy groups in ortho-position to the azo groups, each of the naphthalene nuclei "$R_1$" and "$R_2$" being further substituted by an amino group and two sulfonic acid groups, and wherein the amino groups may be further substituted by alkyl or acyl groups, being generally dark, metallic lustrous powders, insoluble in water, soluble in dilute aqueous alkalies dyeing vegetable fibers blue to bluish-grey clear shades of good fastness properties.

2. As new products ortho-carboxy azodyestuffs containing copper of the probable general formula:

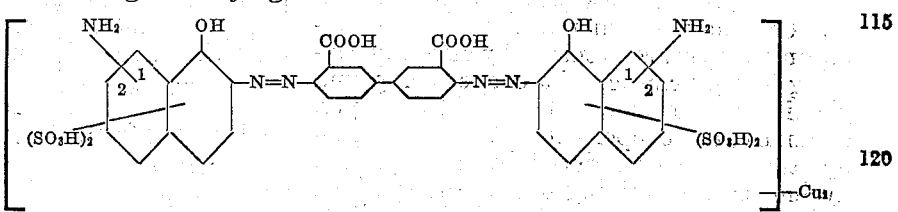

wherein the amino groups stand in 1- or 2-positions of the naphthalene nuclei, being generally dark, metallic lustrous powders, insoluble in water, soluble in dilute aqueous alkalies dyeing vegetable fibers blue to bluish-grey clear shades of good fastness properties.

3. As new products ortho-carboxy azodyestuffs containing copper of the probable general formula:

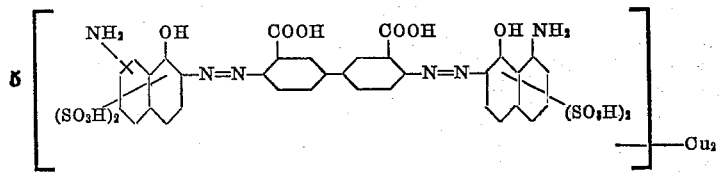

being generally dark, metallic lustrous powders, insoluble in water, soluble in dilute aqueous alkalies dyeing vegetable fibers blue to bluish-grey clear shades of good fastness properties.

4. As a new product the ortho-carboxy azodyestuff containing copper of the probable formula:

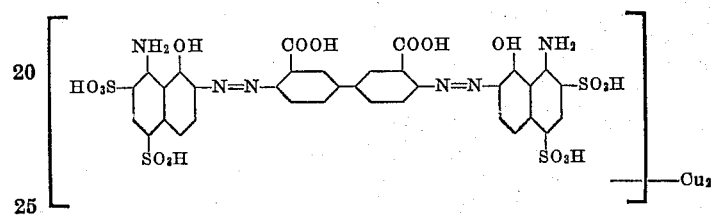

being dark metallic powder, insoluble in water, soluble in dilute aqueous alkalies, dyeing the fiber in outstandingly clear greenish blue shades of excellent fastness to light and ironing.

In testimony whereof, we affix our signatures.

WINFRID HENTRICH.
JOSEF HILGER.